3,655,895
METHODS OF TREATMENT USING 2-ACYLIMINO-1,3-DIAZACYCLOALKANES
Robert Armistead Lucas, Mendham, and Herbert Morton Blatter, Summit, N.J., assignors to Ciba Corporation, Summit, N.J.
No Drawing. Filed July 7, 1969, Ser. No. 839,704
Int. Cl. A61k 27/00
U.S. Cl. 424—251                 2 Claims

ABSTRACT OF THE DISCLOSURE 1-alkyl - 2 - (3,4,5-trimethoxybenzoylimino)-1,3-diazacycloalkanes, e.g. those of the formula

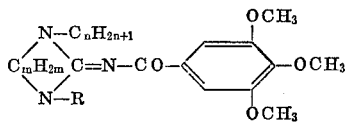

R=H, alkyl or 3,4,5-trimethoxybenzoyl
m=2 or 3,
n=1–4 and salts thereof exhibit sedative effects.

BACKGROUND OF THE INVENTION

According to Burkhardt et al., Chem. Ber. 100, 2569 (1967), 2-(acetyl or benzoyl) - imino - 1,3 - diazacycloalkanes are obtained from N - dichloromethylene - acetamide or -benzamide and diaminoalkanes. This method obviously cannot be used in the preparation of corresponding 3,4,5-trimethoxybenzoylimino derivatives, since the necessary N-dichloromethylene-3,4,5-trimethoxybenzamide cannot be prepared without chlorinating the benzene nucleus in one or both of the ortho positions.

According to another method, various "2-imino-1,3-disubstituted hexahydropyrimidines and imidazolidines" are obtained according to U.S. Pat. No. 3,168,520, which compounds are useful in "the making of dyeings and of synthetic substances fast to gas-fading."

Surprisingly, we have found that the specific 1-alkyl-2-(3,4,5 - trimethoxybenzoylimino) - 1,3-diazacycloalkanes of the present invention, or therapeutically acceptable salts thereof, exhibit sedative effects.

SUMMARY OF THE INVENTION

The present invention concerns and has for its object the provision of new 1-lower alkyl-2-(3,4,5-trimethoxybenzoylimino)-1,3-diazacycloalkanes, or of the tautomeric 1-lower alkyl-2-(3,4,5 - trimethoxybenzoylamino) - 1,3-diazacycloalkenes or of the isomeric 1-lower alkyl-2-imino - 3 - (3,4,5 - trimethoxybenzoyl) - 1,3 - diazacycloalkanes, preferably of those having Formula I

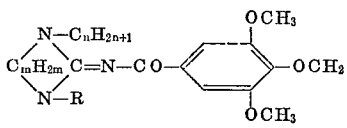

in which R is hydrogen, alkyl with up to 4 carbon atoms or 3,4,5-trimethoxybenzoyl, $C_mH_{2m}$ is lower alkylene separating the adjacent nitrogen atoms by 2 or 3 carbon atoms and n is an integer from 1 to 4, or of therapeutically acceptable salts thereof, as well as of corresponding pharmaceutical compositions and of methods for the preparation and application of these products. Said compositions are useful tranquilizers and anti-anxiety agents.

DESCRIPTION OF THE PREFERRED EMBODIMENTS

The substituent R preferably represents hydrogen but also, for example, methyl, ethyl, n- or i-propyl or -butyl, which radicals equally illustrate the alkyl group $C_nH_{2n+1}$. The lower alkylene radical $C_mH_{2m}$ preferably stands for 1,2-ethylene, 1,2- or especially 1,3-propylene, but also for 1,2-, 1,3- or 2,3-butylene, 1,2-, 1,3-, 2,3- or 2,4-pentylene, -hexylene or -heptylene.

The compounds of the invention exhibit valuable pharmacological properties, for example, central nervous system depressing effects, such as sedative, hypnotic, skeletal muscle relaxing and taming effects. This can be demonstrated in animal tests, using advantageously mammals, such as mice, rats or cats, as test objects. The compounds of the invention can be applied to the animals orally, intraperitoneally or intravenously, e.g. in the form of aqueous solutions or suspensions. The dosage may range between about 1 and about 500 mg./kg./day, preferably between about 5 and about 200 mg./kg./day, advantageously between about 10 and about 100 mg./kg./day. The effect on the spontaneous and induced motor activity can be tested in the mice light box and rotorod test system, wherein a depression is recorded after oral medication. Oral doses in the cat induced a sleep-like state (constricted pupils and relaxed nictitating membranes) from which the animal can be aroused without showing motor incoordination. Low intravenous doses produce in the cat depression of several reflexes, e.g. the flexor and patellar reflex. In hyper-reactive rats with septal lesions, intraperitoneal doses produce a taming effect with minimal neurological deficit. Accordingly, the compounds of the invention are useful sedative-antianxiety agents, for example, in the treatment or management of restlessness and emotional tension and for supression of anxiety and neurotic manifestations. They are also useful intermediates in the preparation of other valuable products, especially of pharmacologically active compounds.

Particularly useful are the compounds of Formula I, in which R is hydrogen or $C_nH_{2n+1}$, $C_mH_{2m}$ is 1,2-ethylene, 1,2- or 1,3-propylene and n is an integer from 1 to 4, and therapeutically acceptable acid addition salts thereof.

Especially valuable is the 1-methyl-2-(3,4,5-trimethoxybenzoylimino)-hexahydropyrimidine or a therapeutically acceptable acid addition salt thereof, which exhibit a high order of CNS-depression and low toxicity, preferably after oral application.

The compounds of this invention are prepared according to methods known per se. For example, the process for their preparation consists in:

(a) Acylating a 1-lower alkyl-2-imino-1,3-diazacycloalkane with 3,4,5-trimethoxybenzoic acid or a reactive functional derivative thereof or (b) Converting in an N-Y-3,4,5-trimethoxybenzamide or -imide, in which Y is a substituent convertible into a 1-lower alkyl - 1,3 - diazacyclo-2-(alkenyl or alkylidene) radical respectively, Y into said radical or (c) Methylating a 1-lower alkyl-2-(3,4,5-trihydroxybenzoylimino)-1,3-diazacycloalkane and, if desired, converting any resulting compound into another compound of the invention.

The acylation according to item (a) is advantageously performed with a reactive functional derivative of 3,4,5-trimethoxybenzoic acid, such as a lower alkyl ester, halide, e.g. chloride or bromide, or anhydride thereof, e.g. the simple or a mixed anhydride with any other suitable acid, such as a lower alkyl carbonic acid.

The substituent Y is, for example, an N-unsubstituted 1,3-diazacyclo-2-(alkylidene or alkenyl) radical, which can be alkylated in the 1-position, for example, with a reactive ester of the alcohol $C_nH_{2n+1}$—OH, e.g. that of a strong mineral or sulfonic acid, e.g. hydrobromic, hydriodic, methane-, ethane- or p-toluenesulfonic acid. Another substituent Y is, for example, a dialkylmercaptomethylene group, e.g. dimethylmercaptomethylene. The corresponding starting material can then be reacted with the diamine $H_2N-C_mH_{2m}-NH-C_nH_{2n+1}$ in order to obtain the compounds of the invention.

The methylation according to item (c) is advantageously performed with diazomethane, but also with a reactive ester of methanol, e.g. such mentioned above.

The compounds so obtained can be converted into each other according to methods known per se. For example, resulting compounds of Formula I, in which R is hydrogen can be acylated or alkylated in 1-position as shown under items (a) and (b). Resulting compounds in which R is 3,4,5-trimethoxybenzoyl can be hydrolyzed, e.g. by the careful application of acidic or alkaline hydrolyzing agents, such as aqueous mineral acids or alkalis, e.g. hydrochloric or sulfuric acid, sodium or potassium hydroxide, carbonate or bicarbonate.

The compounds of the invention are obtained in the free form or in the form of their salts, depending on the conditions under which the above process is carried out. A resulting free base can be converted into a corresponding acid addition salt, for example by reacting it with an inorganic or organic acid, such as a therapeutically useful acid, or with a corresponding anion exchange preparation, and isolating the desired salt. An acid addition salt may be converted into the free compound by treatment with a base, e.g. a metal hydroxide, ammonia or a hydroxyl ion exchange preparation. Therapeutically useful acids are, for example, inorganic acids, e.g. hydrochloric, hydrobromic, sulfuric, phosphoric, nitric or perchloric acid, or organic acids, e.g. carboxylic or sulfonic acids, such as formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic, sulfanilic and cyclohexylsulfamic acid; methionine, tryptophan, lysine and arginine.

These or other salts, for example, the picrates, can also be used for purification of the resulting free compounds, which are converted into salts, the salts separated and the free compounds liberated from the salts. In view of the close relationship between the free compounds and the compounds in the form of their salts, whenever a compound is referred to in this context, a corresponding salt is also intended, provided such is possible or appropriate under the circumstances.

Resulting mixtures of isomers can be separated into the single isomers by methods in themselves known, e.g. by fractional distillation, crystallization and/or chromatography. Racemic products can likewise be resolved into the optical antipodes, for example by separation of diastereomeric salts thereof, e.g. by the fractional crystallization of d- or l-tartrates.

The above reactions are carried out according to standard methods, in the presence or absence of diluents, preferably such as are inert to the reagents and are solvents thereof, of catalysts, condensing, neutralizing agents and/or inert atmospheres, at low temperatures, room temperature or elevated temperatures, at atmospheric or superatmospheric pressure. For example, in the above acylation or alkylation reactions, the generated mineral or sulfonic acid may be neutralized with inorganic or organic bases, such as alkali or alkaline earth metal carbonates or bicarbonates, tri-lower alkylamines or pyridine.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. For example, in the reaction according to item (b) with compounds in which Y is di-lower alkylmercaptomethylene, the intermediate formed first is an isothiourea derivative, which ring-closes in a second step under the influence of heat and/or acidic catalysts. Also in the reaction according to item (c), mono and dimethoxybenzoylimino intermediates are formed during the etherification procedure. Preferred are starting materials which lead to those compounds of the invention, which are indicated above as the preferred embodiments of the invention.

The starting material used is known or, if new, may be prepared according to methods known per se. For example, the starting material mentioned under item (a) is prepared in accordance with the methods described in U.S. Pat. No. 3,027,370 or British Pat. No. 765,547. The starting material mentioned under item (b) in which Y is a 1-unsubstituted 1,3-diazacycloalkyl or -alkenyl radical can be obtained either by the acylation according to item (a) or from corresponding 1-benzyl-2-(3,4,5-trimethoxybenzoylimino)-1,3-diazacycloalkanes, which are subjected to reductive cleavage, e.g. with the use of catalytically activated hydrogen. The starting material in which Y is di-lower alkylmercaptomethylene can be obtained by addition of lower alkylmercaptanes to 3,4,5-trimethoxybenzoylisothiocyanates and reacting the resulting dithiourethanes with a lower alkyl halide or sulfonate. The starting material mentioned under item (c) can be prepared analogous to the process described under item (a) advantageously with the use of 3,4,5-trihydroxybenzoic acid lower alkyl esters.

The pharmacologically active compounds of the invention are useful in the manufacture of pharmaceutical compositions containing an effective amount thereof in conjunction or admixture with excipients suitable for either enteral or parenteral application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories are advantageously fatty emulsions or suspensions. They may be sterilized and/or contain adjuvants, such as preserving, stabilizing, wetting or emulsifying agents, solution promoters, salts for regulating the osmotic pressure and/or buffers. They may also contain other therapeutically valuable substances. Said pharmaceutical compositions are prepared according to conventional mixing, granulating or coating methods respectively and contain about 0.1 to 75%, preferably about 1 to 50% of the active ingredient.

The following examples are intended to illustrate the invention and are not to be construed as being limitations thereon. Temperatures are given in degrees centigrade, and all parts wherever given are parts by weight.

EXAMPLE 1

To the solution obtained from 5.76 g. sodium and 100 ml. anhydrous methanol, 48.58 g. 1-methyl-2-imino-hexahydropyrimidine hydrobromide are added while stirring and cooling. After ½ hour, the mixture is evaporated in vacuo on the water bath for 4 hours. Hereupon 125 ml. tetrahydrofuran are added under nitrogen followed by the solution of 28.8 g. 3,4,5-trimethoxybenzoyl chloride in 185 ml. tetrahydrofuran during 35 minutes at 5–10° while stirring. After stirring overnight at room temperature, the mixture is poured onto 770 ml. ice and water and 21.2 g. sodium bicarbonate are added while stirring. The mixture is extracted three times with 100 ml. methylene chloride, the extract dried, filtered and evaporated below 40°. The residue is triturated with 45 ml. diethyl ether for 1 hour at room temperature, the mixture filtered and the residue washed with cold diethyl ether, to yield the 1-methyl - 2 - (3,4,5-trimethoxybenzoylimino)-hexahydropyrimidine of the formula

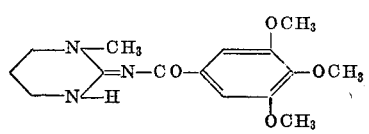

melting at 142–145°.

The starting material is prepared as follows: To the mixture of 97.6 g. 3-methylamino-propylamine and 270 ml. methanol, the solution of 118 g. cyanogen bromide in 270 ml. methanol is added dropwise during 2 hours at 5–15° while stirring. After stirring at room temperature overnight, the mixture is refluxed for 6 hours and evaporated in vacuo. The residue is recrystallized from 217 ml. hot isopropanol and dried for 5 hours in vacuo, to yield the 1-methyl-2-imino-hexahydropyrimidine hydrobromide melting at 142–144°.

EXAMPLE 2

To the solution obtained from 2.3 g. sodium and 40 ml. methanol, 19.4 g. 1-methyl-2-imino-hexahydropyrimidine hydrobromide are added portionwise while stirring. After the initial lumps formed are dissolved, the mixture is evaporated in vacuo at room temperature for about 3 hours. The dry residue is slurried in 40 ml. tetrahydrofuran and 30 ml. triethylamine, whereupon the solution of 23 g. 3,4,5-trimethoxybenzoyl chloride in 50 ml. tetrahydrofuran is added during 15 minutes at 5–15° while stirring. The mixture is stirred at room temperature overnight and evaporated in vacuo. The residue is shaken with 60 ml. methylene chloride and 60 ml. aqueous ammonia, and the aqueous phase washed with methylene chloride. The combined organic solution is washed with 30 ml. water, dried, filtered and evaporated in vacuo. The residue is taken up in 60 ml. benzene and the solution extracted with 30 ml. water and 30 ml. 10% hydrochloric acid. The combined aqueous layer is made basic with ammonia, the precipitate formed filtered off, washed with water, dried and recrystallized from tetrahydrofuran, to yield the 1-methyl-2-(3,4,5-trimethoxybenzoylimino)-3-(3,4,5-trimethoxybenzoyl)-hexahydropyrimidine of the formula

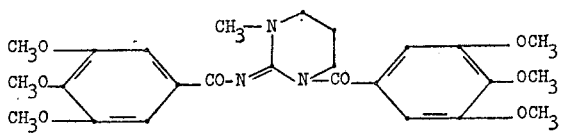

melting at 206–208°.

EXAMPLE 3

Preparation of 1000 tablets each containing 250 mg. of the active ingredient:

| Formula: | G. |
|---|---|
| 1 - methylmethyl - 2 - (3,4,5 - trimethoxybenzolyimino)-hexahydropyrimidine | 250.0 |
| Wheat starch | 346.8 |
| Magnesium aluminum silicate | 20.0 |
| Methylcellulose | 13.3 |
| Stearic acid | 13.3 |
| Colloidal silica | 6.6 |
| Anhydrous ethanol | q.s |
| Purified water | q.s. |

Procedure

All powders with the exception of the silica and 96.8 g. of the starch are passed through a screen having openings of 0.6 mm. and mixed well. From the remaining starch and 65 ml. water a paste is formed which is used to granulate the powders together with the ethanol. The wet granulate is passed through a screen with 2 mm. openings and dried overnight at 35°. The dry granulate is broken in a hammer mill, passed through a screen with 1.2 mm. openings and compressed into tablets each weighing 0.65 g., using concave punches with 12 mm. diameter, uppers quartered.

What is claimed is:

1. A method of treating restlessness, emotional tension and anxiety in a mammal, which comprises the enteral or parenteral administration of a composition consisting essentially of a central nervous system depressing amount of a compound of the formula

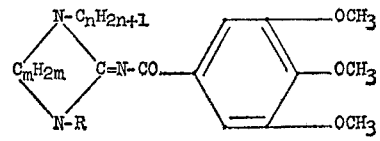

in which R is hydrogen or $C_nH_{2n}+1$, $C_mH_{2m}$ is 1,3-propylene and $n$ is an integer from 1 to 4, or a therapeutically acceptable acid addition salt thereof and a pharmaceutically acceptable excipient, to said mammal in an amount between about 5 to about 200 mg./kg./day of the active ingredient.

2. A method of treating restlessness and anxiety in a mammal, which comprises the enteral administration of a composition consisting essentially of 0.1 to 75% of the 1 - methyl-2-(3,4,5-trimethoxybenzoylimino)-hexahydropyrimidine or a therapeutically acceptable acid addition salt thereof in an enterally acceptable pharmaceutical excipient in an amount between about 10 and about 100 mg./kg./day of the active ingredient.

References Cited

UNITED STATES PATENTS

| 3,027,370 | 3/1962 | Bindler | 260—256.4 H |
| 3,168,520 | 2/1965 | Kleemann et al. | 260—256.4 H |
| 3,483,203 | 12/1969 | Werner | 260—256.4 H |

STANLEY J. FRIEDMAN, Primary Examiner

U.S. Cl. X.R.

260—256.4